United States Patent Office 3,143,418
Patented Aug. 4, 1964

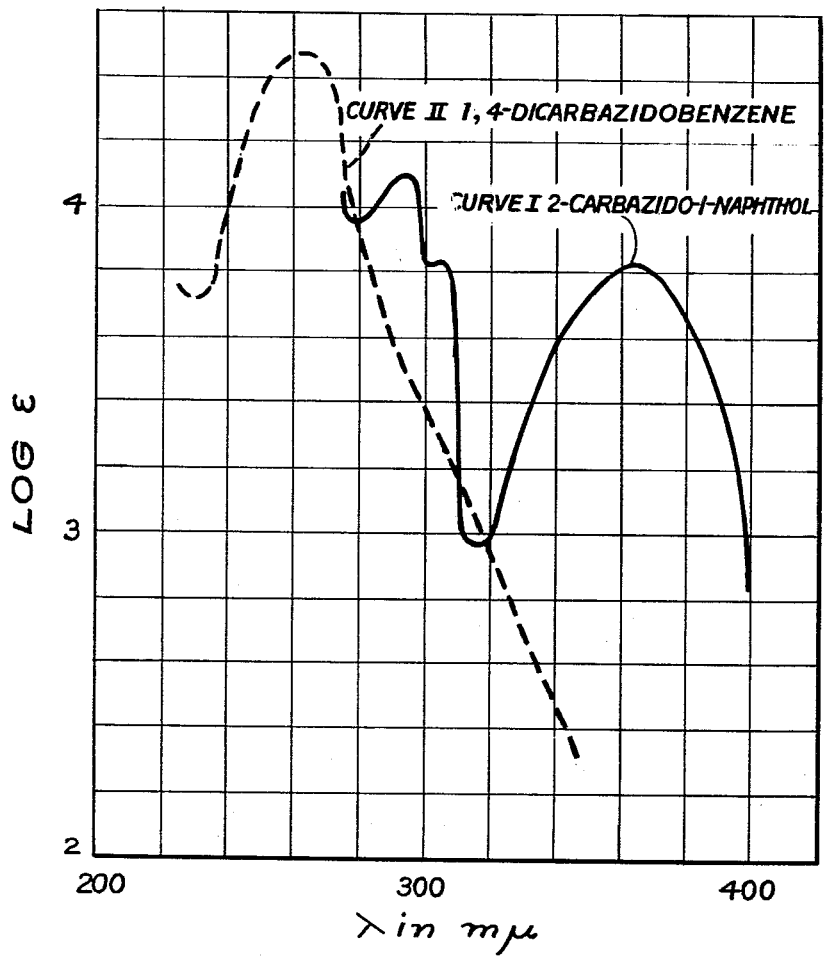

3,143,418
VESICULAR IMAGE-FORMING COATINGS COMPRISING A LIGHT-SENSITIVE CARBAZIDO
William J. Priest and James A. Van Allan, Rochester, N.Y., assignors to Eastman Kodak Company, Rochester, N.Y., a corporation of New Jersey
Filed May 1, 1961, Ser. No. 106,869
10 Claims. (Cl. 96—49)

This invention relates to vesicular-image forming coatings and in particular novel vesicular-image-forming coatings containing carbazido compounds.

It is well known in the art that certain light-sensitive, gas-releasing materials dispersed in matrices of suitable mechanical properties and low permeability coated on a suitable support may be utilized for the preparation of images frequently referred to as vesicular images, and in which the effect is due to groups of very small bubbles retained in the matrix. The preparation of these vesicular images usually involves irradiation through a design followed by brief application of heat.

In the British specification 402,737, dated March 4, 1932, Kalle and Company describe the use of aromatic azides, for example, the sodium salts of azidosalicyclic acid and of "superoxides" in addition to diazonium salts for the purpose of obtaining image effects due to release of gas which produces a "dulling" effect in the exposed areas.

Azido compounds are indeed light-sensitive and release gaseous nitrogen on exposure to light, but the utility of many of these azido compounds is severely limited for the preparation of vesicular images because only light of very short wave length is effectively in bringing about their decomposition. Not only is a light source, which is very rich in ultraviolet radiation necessary to produce good results, but interposition of any material which has a filtering effect on ultraviolet light reduces the sensitivity of such azido compounds to the point of rendering them useless for practical purposes. The antihalation dye in certain commercially available films has such a filtering effect and many azido compounds do not, therefore, ordinarily lend themselves to the preparation of vesicular images from such negatives. Furthermore, such azido compounds are ordinarily unsuitable for the preparation of vesicular prints from negatives coated on film base materials which are opaque to wave lengths above about 2800 Angstrom units, such as polyethylene terephthalate film, certain plasticized cellulose ester film bases and the like.

Many of the azido compounds which can be used in vesicular materials do not produce as satisfactory an image structure as is desired for magnification by projection. Such azido compounds are characterized by producing photolysis products in vesicular material that have undesirable absorption of the activating radiation. These products have unpredictable activity and may form other compounds which tend to produce further undesirable stain in the matrix about the vesicular image.

It is, therefore, an object of this invention to provide photo-decomposing, gas-releasing agents that are sensitive to longer wave lengths of the ultraviolet portions of the spectrum and even extend into the visible portions of the spectrum.

A further object is to provide new and improved gas generators not hitherto employed for the preparation of vesicular photographic images.

Another object is to provide novel vesicular material containing radiation-sensitive, gas-releasing carbazido compounds, which do not show appreciable thermodecomposition on long standing at room temperatures.

Another object is to provide novel photographic vesicular material containing the carbazido compounds, which produce vesicular images with smaller bubble size than produced by prior art materials, thereby greatly improving the resolution and image structure when magnified by projection.

Still another object is to provide vesicular materials that do not produce stained images.

Still other objects will become apparent from the following specification and claims.

These and other objects are accomplished by using as the light-sensitive, gas-releasing agents, carbazido compounds of our invention, which may be represented by the general formula:

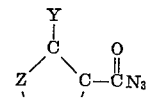

wherein Y represents a hydroxyl group, an amino group, such as an unsubstituted amino group, a methylamino group, an ethylamino group, a propylamino group, an isopropylamino group, a n-butylamino group, a secondary butylamino group, a tertiary butylamino group, a phenylamino group, etc., and a mercapto group; Z is an organic residue made up of the atoms necessary to complete a cyclic structure, such as a monocyclic aromatic nucleus, a bicyclic aromatic nucleus, and a heterocyclic nucleus, and the two carbon atoms that form a part of the cyclic structure are connected to each other by the requisite number of covalent bonds, that is either a single or a double bond depending upon the requirements of the ring atoms adjacent to each of these carbon atoms.

The preferred compounds of our invention may be further represented by the following formulas:

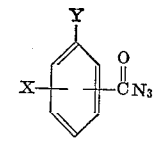

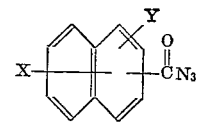

wherein Y defined as above is attached to a carbon atom in the aromatic ring adjacent to the carbon atom in the ring to which the carbazido group is attached; X represents any of the groups which are commonly used as substituents on aromatic rings, such as a hydrogen atom, an alkyl group having from one to four carbon atoms, for example, methyl, ethyl, propyl, isopropyl, butyl, secondary butyl, tertiary butyl, etc., an alkoxy group having from one to four carbon atoms, such as methoxy, ethoxy, propoxy butoxy, etc., an aryl group, such as phenyl, 2-methylphenyl, 2,4-dimethylphenyl, 4-propylphenyl, 2-ethoxyphenyl, 2-butylphenyl, etc., an aryloxy group, such as phenoxy, 2-methylphenoxy, etc., a halogen atom, such as chlorine, bromine, fluorine, iodine, etc., a nitro group, an acyl group, having from one to four carbon atoms, such as a formyl group, an acetyl group, a propionyl group, a butyryl group, etc.

These carbazido compounds are not to be confused with "aromatic azides." Such a comparison would be no more valid than drawing a similarity between chlorobenzene and benzoyl chloride or cinnamoyl chloride.

The carbazido vesicular compounds of our invention are characterized from azido compounds by being sensitive to longer wave lengths of the ultraviolet portion of the spectrum, and this sensitivity even extends into the visible portions of this spectrum. They are further characterized from azido compounds by producing photolysis products which do not absorb the activating radiation.

These photolysis products are more stable than the photolysis products of the azido compounds.

These characterizing differences between our carbazido compounds and the azido compounds are due to the different reaction mechanisms involved. While the azido compounds known before produce nitrogen gas and a labile compound as photolysis products, the carbazido compounds produce nitrogen gas and a new compound having an additional cyclic structure formed by cyclization of the decomposed carbazido group with the hydroxyl group, the amino group or the mercaptan group that is attached to the carbon atom adjacent to the carbon atom bearing the residue of the carbazido group. This reaction occurs as follows:

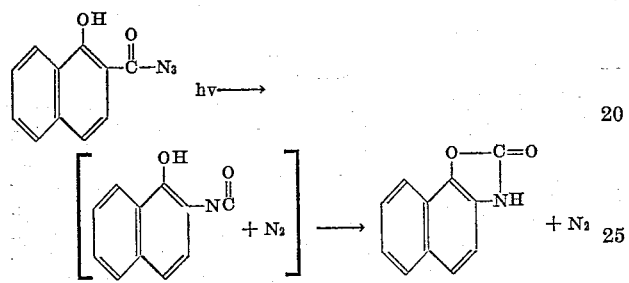

Carbazido compounds produce smaller bubble size in the vesicular materials than azido compounds and other light-sensitive, gas-producing compounds.

The vesicular materials of our invention are prepared by dissolving the desired carbazido compounds in a suitable solvent and mixing it into a suitable matrix material, which can then be either coated on a transparent film base and then used for the preparation of transparencies following exposure through a design and development by heat or, alternatively coated on black paper and then used for the preparation of prints.

The following representative carbazido compounds will illustrate the compounds of our invention but are not to be considered as limiting our invention.

COMPOUND 1

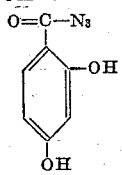

1-carbazido-2,4-dihydroxybenzene

COMPOUND 2

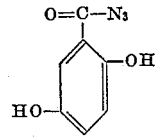

1-carbazido-2,5-dihydroxybenzene

COMPOUND 3

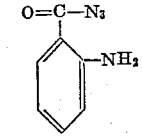

1-carbazido-2-aminobenzene

COMPOUND 4

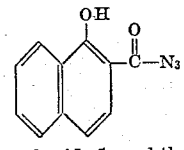

2-carbazido-1-naphthol

COMPOUND 5

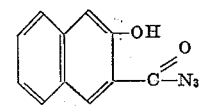

3-carbazido-2-naphthol

COMPOUND 6

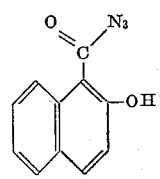

1-carbazido-2-naphthol

COMPOUND 7

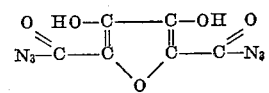

1,4-dicarbazido-2,3-dihydroxyfuran

COMPOUND 8

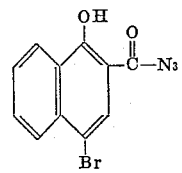

4-bromo-2-carbazido-1-naphthol

COMPOUND 9

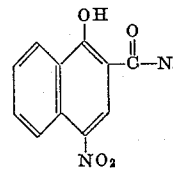

2-carbazido-4-nitro-1-naphthol

COMPOUND 10

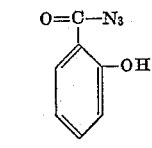

1-carbazido-2-hydroxybenzene

*Example 1*

Carbazido compound No. 1 was prepared as follows. To a cooled solution of 14.8 g. of 2,4-dihydroxybenzhydrazide in 25 ml. of concentrated hydrochloric acid and 250 ml. of water was added 7 g. of sodium azide in 25 ml. of water. After stirring for one-half hour, the solid was collected and recrystallized from aqueous ethanol to yield 7 g. of product melting at 75°–76° C. with decomposition.

Anal. for $C_7H_5N_3O_3$:

|  | C | H | N |
| --- | --- | --- | --- |
| Calc'd | 46.9 | 2.8 | 23.5 |
| Found | 47.3 | 3.4 | 22.8 |

*Example 2*

Carbazido compound No. 2 was prepared by the method used in Example 1 excepting that 2,5-dihydroxybenzhydrazide was used in place of 2,4-dihydroxybenzhydrazide. The product had a melting point of 73° C.

Anal. for $C_7H_5O_3N_3$:

|  | C | H | N |
|---|---|---|---|
| Calc'd | 46.9 | 2.8 | 23.5 |
| Found | 47.1 | 3.0 | 23.8 |

Example 3

Cabazido compound 3 was prepared as follows. A solution of p-methoxybenzene diazonium sulfate prepared from 25 g. of p-anisidine, 25 g. of sulphuric acid, 7 g. of sodium nitrate and 200 g. of ice was added while stirring and cooling to a solution of 15 g. of o-aminobenzhydrazide in dilute hydrochloric acid. The clear yellow solution was stirred for one hour and then neutralized with sodium acetate. The pale yellow solid was collected, washed with water, and dried. The crude product (16 g.) was recrystallized from aqueous acetone to yield 12 g. of product melting at 80°–81° C.

Example 4

Carbazido compound No. 4 was prepared as follows. A suspension of 7.5 g. of 1-hydroxy-2-carbohydrazidonaphthalene in 10 ml. of alcohol and 4 ml. of acetic acid was treated with a solution of 3 g. of sodium nitrite in 8 ml. of water at 10–15° C. with stirring. After stirring for 10 minutes, the reaction mixture had solidified. The crystals were filtered off and crystallized from ethanol to give 4.1 g. of product, M.P. 110° C. (dec.).

Anal. for $C_{11}H_7O_2N_3$:

|  | C | H | N |
|---|---|---|---|
| Calc'd | 62.0 | 3.3 | 19.7 |
| Found | 62.8 | 4.1 | 19.1 |

Example 5

Carbazido compound No. 5 was prepared by the method used in Example 4 but using 2-hydroxy-3-carbohydrazidonaphthalene in place of 1-hydroxy-2-carbohydrazidonaphthalene. The 3-carbazido-2-naphthol had a M.P. of 108° C.

Anal. for $C_{11}H_7O_2N_3$:

|  | C | H | N |
|---|---|---|---|
| Calc'd | 62.0 | 3.3 | 19.7 |
| Found | 62.6 | 3.5 | 18.3 |

Example 6

Carbazido compound No. 6 was prepared as follows. 1-hydrazido-2-hydroxynaphthalene (20.2 g., 0.1 mole) was dissolved in 400 cc. of glacial acetic acid by warming on the steam bath and stirring. The clear solution was cooled to 15° C. by means of a cold water bath. The supersaturated solution was stirred and 7.6 g. of $NaNO_2$ in a minimum amount of water was added, keeping the temperature below 20° C., stirred for one hour at room temperature and then an equal volume of water was added and filtered. The damp filter cake was recrystallized from acetone, filtered from some insoluble starting material (7 g.), treated with Norite, and activated decolorizing charcoal, filtered, chilled, concentrated on a Rinco evaporator, filtered, washed with methanol, and dried; M.P. 120°, exploded 122°. Yield, 8 g.

Anal. for $C_{11}H_7N_3O_2$:

|  | C | H | N |
|---|---|---|---|
| Calc'd | 62.0 | 3.3 | 19.7 |
| Found | 62.2 | 3.3 | 19.3 |

Example 7

Carbazido compound No. 7 was prepared by the procedure described in J. prak. Chem., 146, 209 (1936), and had a melting point of 150° C.

Example 8

Carbazido No. 8 was prepared as follows. A solution of 53 g. of 1-hydroxy-2-naphthoylazide in 300 ml. of acetic acid was treated with 40 g. (13 ml.) of bromine in 50 ml. of acetic acid. After stirring for one-half hour, the product, which had precipitated, was collected by filtration and crystallized from acetone. The product weighed 57 g. and had a melting point of 136 C. with decomposition.

Anal. for $C_{11}H_6O_2N_3Br$:

|  | C | H | N |
|---|---|---|---|
| Calc'd | 45.3 | 2.0 | 14.5 |
| Found | 45.2 | 2.3 | 14.5 |

Example 9

Carbazido compound No. 9 was prepared as follows. 1-hydroxy-2-carbazidonaphthalene (21.3 g.) was suspended in 200 ml. of acetic acid. 20 ml. of nitric acid (d.=1.42) was added at such a rate as to keep the temperature below 35° C. After being stirred for 15 minutes, the reaction mixture solidified. The precipitate was collected on a filter and crystallized from acetonitrile. The product separated as long needle-like crystals, M.P. 160° C. (dec.); yield, 22 g.

Anal. for $C_{11}H_6O_4N_4$:

|  | C | H | N |
|---|---|---|---|
| Calc'd | 51.2 | 2.5 | 21.8 |
| Found | 50.9 | 2.4 | 21.8 |

Example 10

Carbazido compound 10 was prepared by the method similar to that used for preparing carbazido compound No. 1 using 1-hydroxybenzhydrazide in place of 2,4-dihydroxybenzhydrazide. This product had a melting point of 27° C.

The light-sensitive elements of the present invention are prepared by conventional coating procedures. In general, the carbazido compound is dissolved in a suitable solvent, then mixed into a solution of a suitable synthetic polymer in a suitable solvent and coated on the photographic support. Any of the well-known methods for producing a thin uniform coating of the light-sensitive composition may be used. After coating, the volatile solvent is evaporated from the coating composition at room temperature or at an elevated temperature. Drying may be speeded up by use of reduced pressure.

The matrix or binder material used to make the vesicular composition may be any synthetic high polymer having low permeability used for photographic layers, such as polystyrene, vinyl resins, including poly(vinyl alcohol), poly(vinyl butal), etc., poly(vinyl chloride), such as the thermoplastic resins produced by the polymerization of vinylidene chloride, for example, the Saran products, including Saran F–220, Saran 220, etc., the acrylates or mixtures of these polymers with esters of methacrylic acid, that is, the poly(alkyl methacrylates), such as poly(methyl methacrylate), poly(ethyl methacrylate), poly(n-butyl methacrylate), poly(isobutyl methacrylate), poly(n-butyl/isobutyl (1:1) methacrylate), as Lucite 41, 42, 44, 45, and 46, respectively, cellulose derivatives and various combinations of these polymers.

The preferred polymers for use as a matrix or binder in vesicular materials have very low permeabilities in order to be capable of the formation and retention of bubble images from the image-wise release of nitrogen by the photolysis reaction. Ordinarily, the choice of possible matrix materials is limited by this requirement; however, matrix materials having higher permeabilities may be used satisfactorily provided they are overcoated with a very thin layer of another material having low permeability, such as poly(vinyl alcohol), for example, Du Pont's Elvanol, poly(vinylidene chloride), poly(acrylonitrile), etc., and various combinations of these materials. An overcoat thickness of from .18 to .27 mil is used to advantage.

After the volatile solvents have been removed from the vesicular material, it may be exposed to an image, using as activating radiation, ultraviolet light having a wave length in the range of 300 to 385 m$\mu$. The exposed material is then developed by heating for a few seconds to a temperature of from 85° to 110° C. depending upon the carbazido compound used.

Vesicular film materials, such as those of our invention, may be given a prenucleation treatment before image exposure in order to improve speed and tone reproduction in images produced in this material. Prenucleation may involve an over-all uniform exposure of the raw, "as-coated" layer to steam or hot water. Any condensed water droplets, which would subsequently cause mottle, must be blotted from the surface of the film following this treatment. The prenucleated film is then exposed and developed in the normal way to produce images that show a speed increase of eight times that of the nonprenucleated film. The prenucleated film may be stored at ambient conditions for 24 hours before exposure to an image without losing an appreciable amount of this improved speed and tone reproduction.

Any of the organic solvents commonly employed in the art for coating high polymer layers may be used with advantage. Preferred solvents for this purpose are ketones, including acetone, 2-butanone (methyl ethyl ketone), 4-methyl-2-pentanone, etc. Other excellent solvents include dimethylformamide and tetrahydrofuran.

The vesicular compositions of our invention may contain the carbazido compound in the dried binder material at concentration as low as about 2 percent and as high as the concentration at which the carbazido compound tends to crystallize out. The concentration at which the carbazido compound will crystallize out varies with the carbazido compound; however, in general, crystallization does not occur until the concentration is somewhat above 20 percent. These compounds are generally used in the range of from 2 to 10 percent since it has been observed that concentrations higher than 10 percent do not improve the results obtained.

The preparation of our vesicular materials is illustrated by the following examples:

*Example 11*

A coating composition consisting of the following:

| | |
|---|---|
| 35 percent Saran F-220 in methyl ethyl ketone solution _____ g-- | 9 |
| 20 percent Lucite 41 in methyl ethyl ketone solution _____ g-- | 1.7 |
| 2-carbazido-1-hydroxynaphthalene _____ g-- | 0.35 |
| Methyl ethyl ketone _____ cc-- | 2 | was cast on a sheet of polyethylene terephthalate using a coating knife with a 6-mil clearance. The coating was allowed to dry as cast, then heated for 15 minutes at 100° C. to remove most of the volatile solvent. A portion of this coating was exposed through a step tablet with density increments of 0.15 to the light of two 4-watt black lights (near U.V.) separated from the negative by a 4-mm. glass plate for a period of 60 seconds. Immediately following this exposure, the exposed sample was heated to 100° C. for one minute. In the exposed area, there were developed reproductions of 11 of the steps printed and the fog level was essentially zero. The average bubble size was very small, and there was practically no background color.

*Example 12*

Another sample of the coating obtained in Example 11 was exposed to the rays of a high pressure 360-watt mercury arc at a distance of about 15 inches for four seconds, then removed and heated for 5 seconds in water at 60° C. This treatment produced a uniform distribution of very fine bubbles throughout the matrix which functioned as nuclei for accumulation of gas produced in subsequent exposure. After this preflashed coating had been allowed to stand for several hours at room temperature, a portion was exposed and developed in the manner of the sample in Example 11. For an exposure time of 60 seconds, using the step wedge described in Example 11, and the same development conditions, a reproduction of 16 image steps was obtained.

*Example 13*

A coating composition was prepared by mixing a solution of 0.15 g. of 1-carbazido-2-aminobenzene in 2.6 ml. of 2-butanone into 7.5 g. of a 30 percent by weight mixture containing nine parts of Saran 220 and one part of Lucite 41 in 2-butanone. This was coated on a sheet of polyethylene terephthalate using a doctor blade with a 6-mil clearance. The solvent was evaporated from the coating at room temperature for two hours under a vacuum. The dry coating was about 0.4 mil thick.

The coating was exposed for two minutes through a step wedge having 0.15 density unit increments in the same apparatus used in Example 12. This exposed material was developed for 10 seconds at 90° C. to produce a reproduction of five steps of the step wedge.

*Example 14*

A coating was made on a sheet of polyethylene terephthalate as in Example 13 but using a coating composition prepared by mixing a solution of 0.6 g. of 1-carbazido-2,4-dihydroxybenzene in 1 ml. dimethylformamide into 10 g. of a 30 percent by weight solution of a mixture containing nine parts of Saran 220 and one part of Lucite 41 in 2-butanone.

This coating was baked for 15 minutes at 90° C. to remove the solvent. The coating was exposed for one minute and, developed as in Example 13. The developed material had a reproduction of five steps of the step wedge.

*Example 15*

A vesicular coating was made, dried, exposed, and developed as in Example 14 but using a 1-carbazido-2,5-dihydroxybenzene in place of the 1-carbazido-2,4-dihydroxybenzene.

This material reproduced ten steps of the step wedge.

*Example 16*

A vesicular coating was made as in Example 14 but using 1-carbazido-2-hydroxybenzene in place of 1-carbazido-2,4-dihydroxybenzene and a 30 percent solution of Saran 220 instead of the mixture of Saran 220 and Lucite 41. Following a 100-second exposure through the .15 density unit increment wedge in the apparatus described, the material was developed at 100° C. to produce a reproduction of ten steps.

*Example 17*

15 g. of a 30 percent solution of a mixture of nine parts of Saran F–220 to one part of Lucite 41 in acetone was mixed with .45 g. of 4-bromo-2-carbazido-1-naphthol dissolved in 5 ml. tetrahydrofuran coated as shown in Example 13 and baked according to the schedule in Example 14. Following the exposure and development procedure given in Example 14, nine steps of the step wedge were reproduced in the vesicular material.

The following example is to illustrate the use of prenucleation to improve the speed and tone reproduction of our vesicular materials.

Example 18

1.6 g. of 2-carbazido-1-naphthol was dissolved in 22 g. of methyl ethyl ketone. The solution was added to a binder comprising 18.4 g. vinylidene chloride-acrylonitrile copolymer (such as Dow Saran F–220), 1.6 g. methyl methacrylate (Du Pont Lucite 41) dissolved in 59 g. methyl ethyl ketone.

The resulting solution was then coated on polyethylene terephthalate film base using a coating blade with a 6-mil clearance. The coating was dried at 78° C. for 10 minutes and then cured at 95° C. for 15 minutes.

The coating was then exposed for 3 minutes through a photographic step tablet consisting of 12 steps of 0.3 density increments with a Gates Raymaster High Power "Uviarc" mercury vapor ultraviolet lamp. The film was then developed by heating in an oven for 15 to 30 seconds at 90° C. The resultant transparency contained an image of two steps of the step tablet used.

A portion of the film made above was treated by passing live steam over it for about 5 seconds. The film was then exposed and developed as above. The resultant transparency contained an image of five steps of the step tablet used, representing a gain of 0.9 log exposure over that of untreated film.

Another portion of the film was treated by immersing it in boiling water for about 5 seconds. This film was exposed and developed as above to produce a transparency reproducing an image of five steps of the step tablet used.

The following table lists the "λ max." or the wavelength of activating radiation at which the efficiency of the absorption of the radiation by typical carbazido compounds of our invention is a maximum. It will be noted that these λ max. values fall in the range of 365 mμ to 380 mμ. In comparison to these, furoylazide has a λ max. value of 276.

| Carbazido Compound | λ max. in mμ | ε Molecular Extinction Coefficient |
| --- | --- | --- |
| 2 | 365 | 3,000 |
| 3 | 365 | 18,700 |
| 4 | 365 | 7,500 |
| 5 | 380 | |

The novel vesicular image-forming elements of our invention have good thermal stability to prolonged storage at elevated temperatures. The following example will illustrate the stability shown by a typical element.

Example 19

Specimens of a coating having the following composition:

10 parts of 2-carbazido-1-naphthol
90 parts of Saran F–220
10 parts of Lucite 41 about .5 mil thick on a polyester support were incubated at 36° C., 50% R.H. as well as at 25° C. and 50% R.H. After 100 days the incubated specimens showed the same number of steps (i.e., 10 in increments of log E 0.15) as the unincubated coating.

The accompanying drawing illustrates the greatly improved sensitivity of our carbazido compounds to activating radiation of longer wavelengths as compared to the sensitivity of other carbazido compounds. Curves I and II of the drawing show the relation of log ε (molecular extinction coefficient) to λ the wavelength of the activating radiation.

Curve I shows this relationship for a vesicular coating containing 2-carbazido-1-naphthol.

Curve II shows this relationship for a vesicular coating containing 1,4-dicarbazidobenzene.

It will be noted from the drawing that 2-carbazido-1-naphthol has a λ max. at 365 mμ and has considerable sensitivity at a λ of 400 mμ. This compound has a secondary sensitivity peak at 290 mμ. The coating containing 1,4-dicarbazidobenzene has its λ max. at 264 mμ from which it falls rapidly. This compound's sensitivity at a λ of 320 mμ is comparable to the sensitivity of 2-carbazido-1-naphthol at 400 mμ.

The novel vesicular image-forming materials of our invention contain carbazido compounds as the light-sensitive, gas-forming compounds. The carbazido compounds of our invention are aromatic or heterocyclic; and they are characterized by having a hydroxy, a primary amino, a secondary amino, or a mercapto group attached to the carbon atom of the cyclic structure that is adjacent to the carbon atom to which the carbazido group is attached. Our carbazido compounds and vesicular image-forming materials containing them are characterized by being sensitive to activating radiation in the longer wavelength portion of the ultraviolet spectrum and even into the visible spectrum. Sensitivity peaks are as high as 385mμ with sensitivity extending up to 400mμ and higher. Some azido compounds that are outside our invention have sensitivity peaks 100mμ lower than our carbazido compounds. Upon exposure to activating radiation, our compounds undergo photolysis in which nitrogen gas is released and a new compound is formed with an additional cyclic structure formed by the cyclization of the carbazido residue with the hydroxy group, the amino group or the mercapto group. These new compounds have no absorption to the activating radiation and are very much more stable than the products formed by the photolysis of prior art azido compounds when used in vesicular materials. The photolysis products of prior art azido compounds in comparison are very reactive and not only absorb activating radiation themselves but may react in unpredicatble ways with themselves or other materials present to produce undesirable discoloration in the resulting image. Our vesicular compounds are further characterized by producing vesicular images with smaller bubble size, which gives greatly improved resolution and image structure when the images are to be magnified by projection.

The invention has been described in deatil with particular reference to preferred embodiments thereof but it will be understood that variations and modifications can be effected within the spirit and scope of the invention as described hereinabove and as defined in the appended claims.

We claim:

A photographic vesicular-image-forming element comprising
(1) a support coated with
(2) a layer comprising a binder selected from the class consisting of homopolymers of styrene, homopolymers of vinyl chloride, homopolymers of vinylidene chloride, copolymers of vinyl chloride with a different vinyl monomer, and copolymers of vinylidene chloride with a vinyl monomer said binder having a low permeability to nitrogen gas;
and a non-light exposed, light-sensitive compound selected from those having the formulas:

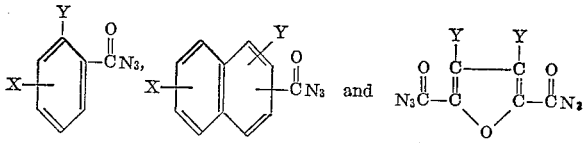

wherein Y represents a group selected from the class consisting of the hydroxyl group, an amino group having at least one hydrogen atom attached to the nitrogen atom, and the mercapto group, said Y groups being attached to a carbon atom adjacent to the carbon atom in the ring to which the carbazido group is attached; X represents a group selected from the class consisting of the hydrogen atom, an alkyl group having from 1 to 4 carbon atoms, an alkoxy group having from 1 to 4 carbon atoms, an aryl group, a halogen atom, the nitro group, an acyl group having from 1 to 4 carbon atoms and an aryloxy group; said light-sensitive compound upon exposure to light releases nitrogen gas and produces a new nonreactive compound which will not absorb light, said layer being applied to said support in a solvent solution, said coated layer of solvent solution having a thickness of up to about 6 mils.

2. A photographic vesicular-image-forming element of claim 1 in which the support is transparent.

3. A photographic vesicular-image-forming element of claim 1 in which the support is black paper.

4. A photographic vesicular-image-forming element of claim 1 in which the said light-sensitive compound is 1-carbazido-2,5-dihydroxybenzene.

5. A photographic vesicular-image-forming element of claim 1 in which the said light-sensitive compound is 2-amino-1-carbazidobenzene.

6. A photographic vesicular-image-forming element of claim 1 in which the said light-sensitive compound is 2-carbazido-1-naphthol.

7. A photographic vesicular-image-forming element of claim 1 in which the said light-sensitive compound is 4-bromo-2-carbazido-1-naphthol.

8. A photographic vesicular-image-forming element of claim 1 in which the binder is a mixture of (1) a copolymer of vinylidene chloride with acrylonitrile and (2) a polymethyl methacrylate.

9. A photographic vesicular-image-forming element of claim 1 in which the binder is a poly(vinylidene chloride) resin.

10. A process for forming a vesicular image in a light-sensitive vesicular-image-forming layer coated on a support, said process comprising the steps of:

(1) exposing said layer to light through an original image, to produce an imagewise release of nitrogen gas and a nonreactive nongaseous photolysis product which has no absorbtion of said light, said nitrogen gas and nongaseous photolysis product being released from a light-sensitive compound selected from those having the formulas:

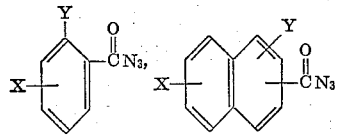

and

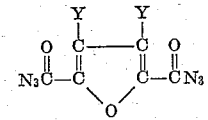

wherein Y represents a group selected from the class consisting of the hydroxyl group, an amino group having at least one hydrogen atom attached to the nitrogen atom, and the mercapto group, said Y groups being attached to a carbon atom adjacent to the carbon atom in the ring to which the carbazido group is attached; X represents a group selected from the class consisting of the hydrogen atom, an alkyl group having from 1 to 4 carbon atoms, an alkoxy group having from 1 to 4 carbon atoms, an aryl group, a halogen atom, the nitro group, an acyl group having from 1 to 4 carbon atoms and an aryloxy group; said light-sensitive compound being dispersed in a synthetic film-forming binder selected from the class consisting of homopolymers of styrene, homopolymers of vinyl chloride, homopolymers vinylidene chloride, copolymers of vinyl chloride with a different vinyl monomer, and copolymers of vinylidene chloride with a vinyl monomer said binder having a low permeability to nitrogen gas; and (2) heating the said image exposed layer to a temperature of from 85° to 110° C. to cause the formation of a vesicular image corresponding to the said original image.

References Cited in the file of this patent

UNITED STATES PATENTS

| | | |
|---|---|---|
| 2,695,846 | Mally | Nov. 30, 1954 |
| 2,764,599 | Clifford et al. | Sept. 25, 1956 |
| 2,911,299 | Baril et al. | Nov. 3, 1959 |
| 2,948,610 | Merrill et al. | Aug. 9, 1960 |
| 3,032,414 | James et al. | May 1, 1962 |
| 3,062,650 | Sagura et al. | Nov. 6, 1962 |

OTHER REFERENCES

Darapsky et al: Journal Fur Praktische Chemie, vol 146, 1936, pages 215–216. (Copy in Sci. Library.)

Chemical Abstracts, 5th decennial subject index, vol. "C–C," 1960, page 2571s. (Copy in Sci. Library.)